United States Patent
Nielson (10) Patent No.: US 10,495,127 B2
(45) Date of Patent: Dec. 3, 2019

(54) APPARATUS, SYSTEM AND METHOD FOR A FASTENER WITH AN INTERIOR SHAFT

(71) Applicant: Anthony Nielson, Layton, UT (US)

(72) Inventor: Anthony Nielson, Layton, UT (US)

( * ) Notice: Subject to any disclaimer, the term of this patent is extended or adjusted under 35 U.S.C. 154(b) by 165 days.

(21) Appl. No.: 15/422,316

(22) Filed: Feb. 1, 2017

(65) Prior Publication Data

US 2017/0234352 A1  Aug. 17, 2017

Related U.S. Application Data

(60) Provisional application No. 62/289,828, filed on Feb. 1, 2016.

(51) Int. Cl.
  *B25B 15/00* (2006.01)
  *B25B 23/00* (2006.01)
  *F16B 23/00* (2006.01)

(52) U.S. Cl.
  CPC ........ *F16B 23/0007* (2013.01); *B25B 15/004* (2013.01); *B25B 23/0035* (2013.01)

(58) Field of Classification Search
  CPC ... B25B 15/001; B25B 15/004; B25B 15/005; F16B 23/0035; F16B 23/0007; F16B 23/003; F16B 23/0038; F16B 41/005
  USPC .................................................. 411/403, 910
  See application file for complete search history.

(56) References Cited

U.S. PATENT DOCUMENTS

| | | | | |
|---|---|---|---|---|
| 2,338,023 A | * | 12/1943 | Bugg | F16B 23/0046 411/403 |
| 2,397,216 A | * | 3/1946 | Stellin | F16B 23/0007 411/404 |
| 2,813,450 A | | 11/1957 | Dzus | |
| 3,693,495 A | | 9/1972 | Wagner | |
| 3,872,904 A | | 3/1975 | Barlow | |
| 3,874,258 A | | 4/1975 | Semola et al. | |
| 3,888,144 A | | 6/1975 | Parsons | |
| 3,963,322 A | | 6/1976 | Gryctko | |
| 4,242,932 A | * | 1/1981 | Barmore | F16B 23/0092 411/403 |
| 4,832,556 A | * | 5/1989 | Dowling | A47B 13/021 403/350 |

(Continued)

OTHER PUBLICATIONS

PCT/US2017/016072, "Notification of Transmittal of the International Search Report and the Written Opinion of the International Searching Authority, or the Declaration", dated Apr. 25, 2017.

*Primary Examiner* — David B. Thomas
(74) *Attorney, Agent, or Firm* — Kunzler Bean & Adamson (57) ABSTRACT

An apparatus, system, and method are disclosed. The apparatus includes a body coupled to a head, the head including a hole of at least three sides and a shaft of at least three sides, the shaft being disposed inside the hole. The system includes a fastener apparatus that includes a head including a hole of at least three sides and a shaft of at least three sides located inside the hole. The system further includes a fastener driver that includes a driver head of at least three sides, and a driver hole of at least three sides, the driver hole located within the head. The method includes providing a fastener apparatus that includes a body coupled to a head, the head including a hole of at least three sides and a shaft of three sides that is located within the hole. The method further includes using the fastener apparatus.

16 Claims, 9 Drawing Sheets

(56) References Cited

U.S. PATENT DOCUMENTS

| | | | |
|---|---|---|---|
| 5,168,782 A * | 12/1992 | Cromwell | B25B 23/0021 81/177.2 |
| 5,366,330 A | 11/1994 | Cosenza | |
| 5,540,531 A | 7/1996 | Choiniere | |
| 5,752,418 A * | 5/1998 | Robins | B25B 15/001 81/177.2 |
| 6,024,522 A | 2/2000 | Bainbridge et al. | |
| 6,017,177 A | 6/2000 | Lanham | |
| 6,186,718 B1 | 2/2001 | Fogard | |
| 6,368,322 B1 | 4/2002 | Luks et al. | |
| 6,755,748 B2 | 6/2004 | Brooks | |
| 6,792,838 B2 | 9/2004 | Brooks et al. | |
| 6,988,432 B2 | 1/2006 | Brooks | |
| 7,278,341 B1 * | 10/2007 | Novin | B25B 13/065 411/428 |
| D568,731 S | 5/2008 | Campbell | |
| 7,614,264 B2 * | 11/2009 | McGettrick | E05B 9/08 248/553 |
| 7,771,459 B2 | 8/2010 | von Oepen | |
| 8,317,443 B2 | 11/2012 | Stauch et al. | |
| 8,992,151 B2 | 3/2015 | Parker | |
| 9,004,836 B2 | 4/2015 | Wells et al. | |
| 9,638,234 B2 * | 5/2017 | Campbell | B25B 15/004 |
| 9,765,807 B1 * | 9/2017 | Watts | F16B 23/0061 |
| 2003/0075027 A1 | 4/2003 | Brooks | |
| 2005/0086791 A1 | 4/2005 | Brooks | |
| 2005/0158148 A1 | 7/2005 | Brooks | |
| 2005/0172761 A1 | 8/2005 | Brooks | |
| 2007/0043379 A1 | 2/2007 | Sullivan, Jr. et al. | |
| 2008/0038087 A1 | 2/2008 | Brooks | |
| 2008/0226423 A1 | 9/2008 | Brooks | |
| 2008/0279653 A1 | 11/2008 | Brooks | |
| 2009/0069103 A1 | 3/2009 | Su | |
| 2009/0129887 A1 * | 5/2009 | Chang | B25B 13/485 411/402 |
| 2013/0011215 A1 * | 1/2013 | Wells | F16B 23/0007 411/402 |
| 2013/0030476 A1 | 1/2013 | Shimko et al. | |

* cited by examiner

APPARATUS, SYSTEM AND METHOD FOR A FASTENER WITH AN INTERIOR SHAFT

FIELD

This invention relates to fasteners and more specifically to an apparatus for a fastener with an interior shaft.

BACKGROUND

Fasteners such as screws, bolts, and like are often used to fasten two or more objects together. However, a point of contact, such as a screwdriver, on the head of the fastener may wear, strip, or deform over time and with repeated use. Debris may become trapped inside the screw drive and prevent a driver from contacting one or more sides of the screw drive. Furthermore, a driver may experience camming due to a tapering of a slot in the screw drive and require a user to push down harder to turn the fastener.

SUMMARY

An apparatus, system and method are disclosed.

The fastener apparatus includes a head with a hole of at least three sides and a shaft of at least three sides inside the hole. The fastener apparatus also has a body coupled to the side of the head opposite the hole.

The system includes a fastener apparatus, including a head, which has a hole of at least three sides and a shaft of at least three sides inside the hole, as well as a body coupled to the side of the head opposite of the hole. The system also includes a fastener driver, which includes a driver head comprising at least three sides and a driver hole in the head, the hole being made up of at least three sides.

The method includes providing a fastener apparatus that includes a head of a fastener apparatus, the head including a hole of at least three sides, and a shaft of at least three sides located inside the hole, and a body of a fastener apparatus that is connected to the side of the head opposite the hole. The method also includes using the fastener apparatus.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
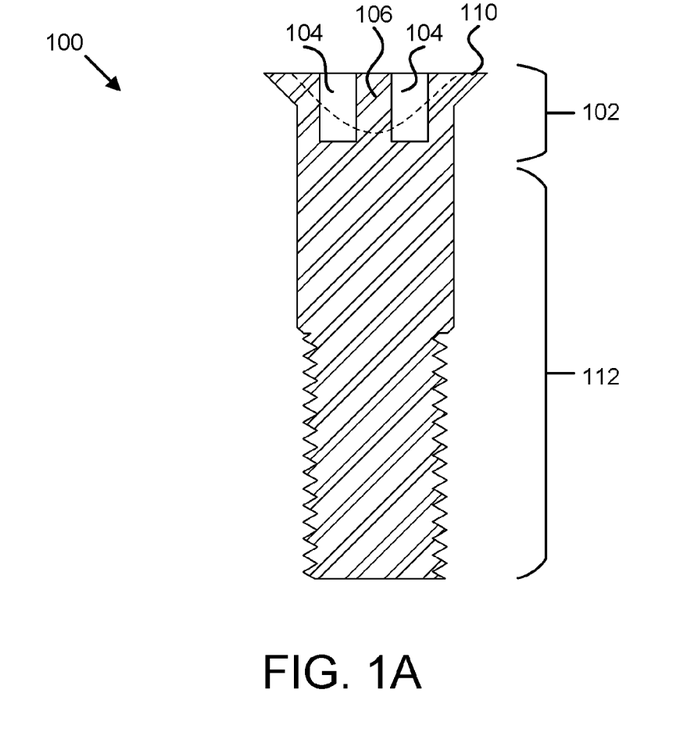
FIG. 1A is a cutaway side view of one embodiment of a fastener for an apparatus for a fastener with an interior shaft.
Figure 1B:
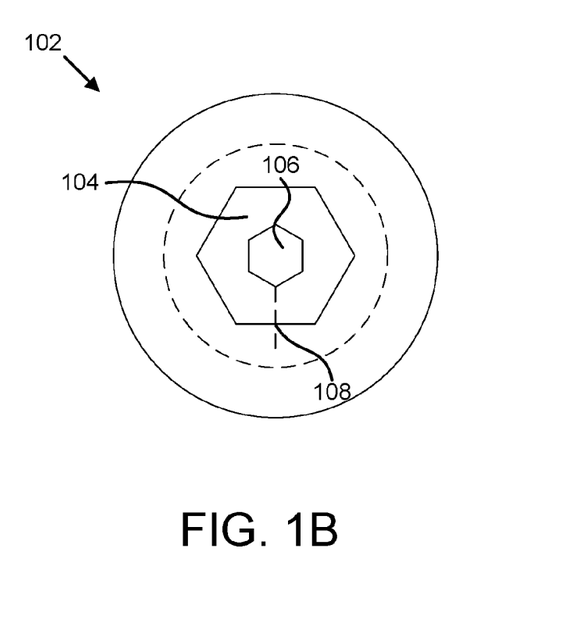
FIG. 1B is a top-down view of a further embodiment of a fastener for an apparatus for a fastener with an interior shaft.

FIGS. 1A and 1B depict one embodiment of a fastener 100 for an apparatus for a fastener with an interior shaft. The fastener 100 may include one or more fasteners used in a variety of contexts. For example, the fastener 100 may comprise an aircraft fastener, a surgery fastener, an automotive fastener, or another type of fastener. In certain embodiments, the fastener 100 may include a fastener that a user may fasten and unfasten repeatedly. The fastener 100 may comprise a metal material. For example, the fastener 100 may include iron, steel, aluminum, titanium, or another metal.

In one embodiment, the fastener 100 includes a head 102. In certain embodiments, the head 102 may include a hole 104. The hole 104 may be disposed on top of the head 102. The hole 104 may be centered on the top of the head 102. As depicted in FIG. 1A, in certain embodiments, the hole 104 may include a flat bottom. The hole 104 may include at least three sides. For example, the hole 104 may include six sides, as depicted in FIG. 1B. In certain embodiments, as depicted in FIG. 1B, the hole 104 may comprise an equilateral hexagon. In some embodiments, the sides may comprise sides perpendicular to the bottom of the hole 104. In certain embodiments, the hole 104 may slightly taper near the bottom of the hole 104. The slight tapering may assist a user in placing a driver in position to rotate the fastener 100 as described below.

In one embodiment, the head 102 may include a shaft 106. The shaft 106 may be disposed inside the hole 104. In one embodiment, the shaft 106 may be disposed in the center of the hole 104. The shaft 106 may include at least three sides. In one embodiment, as depicted in FIG. 1B, the shaft 106 may include the same number of sides as the hole 104 and/or the same shape as the hole 104. In one embodiment, one or more corners of the shaft 106 may bifurcate one or more sides of the hole 104 of the fastener 100. For example, as depicted in FIG. 1B, the closest point 108 on a side of the hole 104 of the fastener 100 to a corner of the shaft 106 of the fastener 100 is the center of the side of the hole 104. In one embodiment, the top of the shaft 106 may include a slight taper. The taper may assist a user place a driver in a position to rotate the fastener 100 as described below.

Figure 1C:
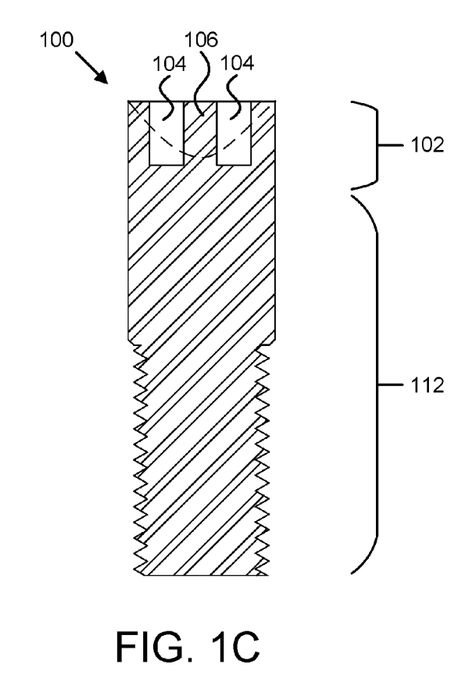
FIG. 1C is a cutaway side view of a further embodiment of a fastener for an apparatus for a fastener with an interior shaft.

In one embodiment, the head 102 may include a flange 110 disposed around an edge of the head 102 as depicted in FIG. 1A. The flange 110 may prevent the fastener 100 from protruding into a surface deeper than the top of the fastener 100. The flange 110 may also provide a surface or edge for a user to grip the fastener 100. In one embodiment, the head 102 may be free of a flange 110 disposed around an edge of the head 102 as depicted in FIG. 1C.

In one embodiment, the fastener 100 may include a body 112 coupled to the side of the head 102 opposite the hole 104. The side of the head 102 opposite the hole 104 may include the bottom of the head 102. The body 112 may include a piece of material that protrudes from the head 102. The body 112 may include a circular shape or another shape. The body 112 may include a certain length. Although not depicted, in some embodiments, the body 112 may include an end tapered to a point. The end tapered to a point may be disposed on the end of the body 112 distal to the head 102.

In one embodiment, the end of the body 112 distal to the head 102 may include a flat edge, a rounded, edge, or another shaped end.

Figure 1D:
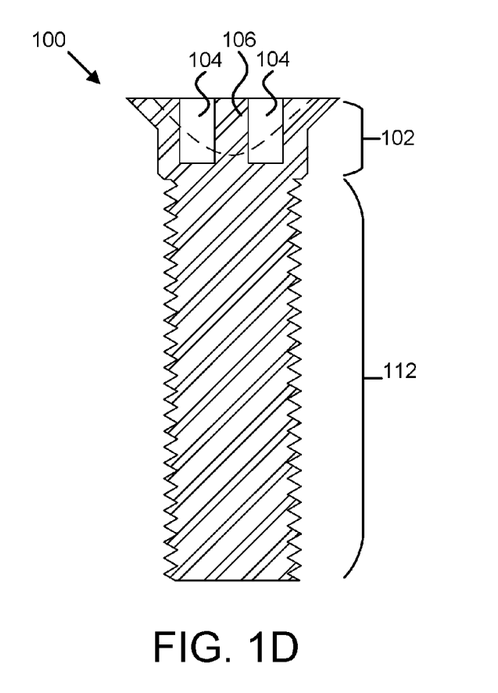
FIG. 1D is a cutaway side view of a further embodiment of a fastener for an apparatus for a fastener with an interior shaft.

In one embodiment, the body 112 may include a threading. The threading may include a wedge wrapped around a portion of the body 112. In one embodiment, as depicted in FIG. 1C, the threading may wrap around a portion of the body 112 that is less than the entire body 112. In some embodiments, as depicted in FIG. 1D, the threading may wrap around substantially the entire body 112. In certain embodiments, the threading may include threading of different spacing in between the different portions of the threading. For example, in one embodiment, the threading may be close together and may not include a space between different portions of the threading. In other embodiments, the threading may include a space between different portions of the threading. Although not depicted, in one embodiment, the body 112 may be free of threading and/or may include a smooth surface.

Figure 2A:
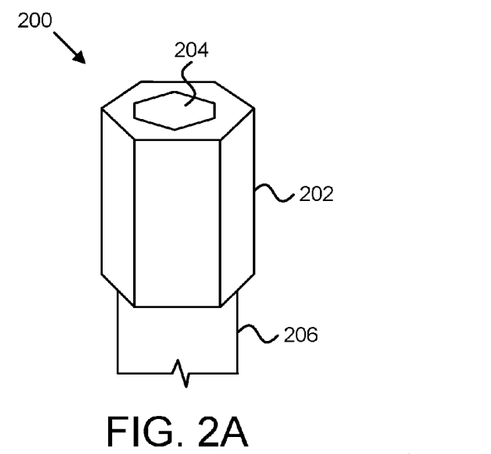
FIG. 2A is a perspective view of one embodiment of a fastener driver for an apparatus for a fastener with an interior shaft.

FIG. 2A depicts one embodiment of a fastener driver 200 for an apparatus for a fastener with an interior shaft. In one embodiment, the fastener driver 200 may include a head 202. The head 202 may include at least three sides. In one embodiment, the sides of the head 202 may include sides perpendicular to the top of the head 202. In certain embodiments, the head 202 may slightly taper near the sides of the head 202. The slight tapering may assist a user in placing the fastener driver 200 in position to rotate a fastener 100 as described below.

Figure 2B:
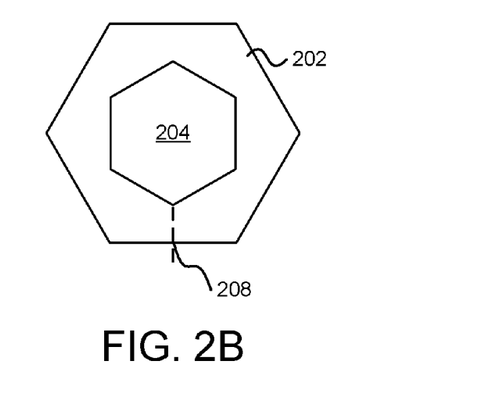
FIG. 2B is a top-down view of a further embodiment of a fastener driver for an apparatus for a fastener with an interior shaft.

In one embodiment, the fastener driver 200 may include a hole 204. The hole 204 may be disposed over the head 202. The hole 204 may be centered on the top of the head 202 (the top of the head 202 being the side of the head 202 opposite the connection 206 described below). The hole 204 may include three or more sides. For example, as depicted in FIGS. 2A and 2B, the hole 204 may include six sides. In certain embodiments, the hole 204 may include an equilateral hexagon. In one embodiment, the sides of the hole 204 may include sides perpendicular to the bottom of the hole 204. In certain embodiments, the hole 204 may slightly taper near the bottom of the hole 204. The slight tapering may assist a user in placing the fastener driver 200 in position to rotate a fastener 100 as described below.

In one embodiment, one or more corners of the hole 204 of the fastener driver 200 may bifurcate one or more sides of the head 202 of the fastener driver 200. For example, as depicted in FIG. 2B, the closest point 208 on a side of the head 202 to a corner of the hole 204 is the center of the side of the head 202.

The fastener driver 200 may include a connection 206. The connection 206 may connect to a portion of a tool. For example, the connection 206 may connect to a drill, a screwdriver, a ratchet or another tool. In some embodiments, the connection 206 may include a connection 206 that removably couples to a tool.

Figure 2C:
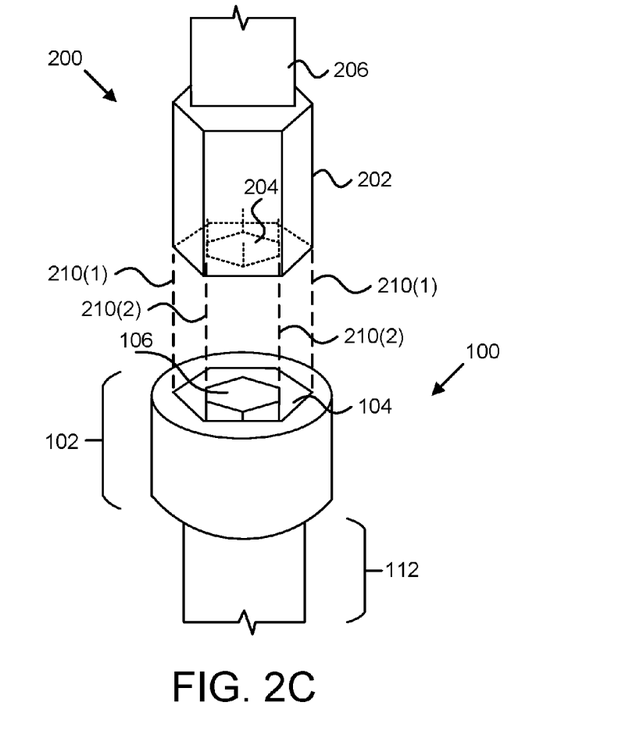
FIG. 2C is a perspective view of one embodiment of a fastener and a fastener driver for an apparatus for a fastener with an interior shaft.

FIG. 2C depicts one embodiment of a fastener 100 and a fastener driver 200 for an apparatus for a fastener with an interior shaft. In one embodiment, the head 202 of the fastener driver 200 may be shaped and sized to fit within the hole 104 of the fastener 100. For example, as depicted in FIG. 2C, the first set of dotted lines 210(1) show that the head 202 of the fastener driver 200 fits within the hole 104 of the fastener 100. In one embodiment, the shaft 106 of the fastener 100 may be sized and shaped to fit within the hole 204 of the fastener driver 200. For example, as depicted in FIG. 2C, the second set of dotted lines 210(2) show that the shaft 106 of the fastener 100 inserts into the hole 204 of the fastener driver 200.

Figure 3:
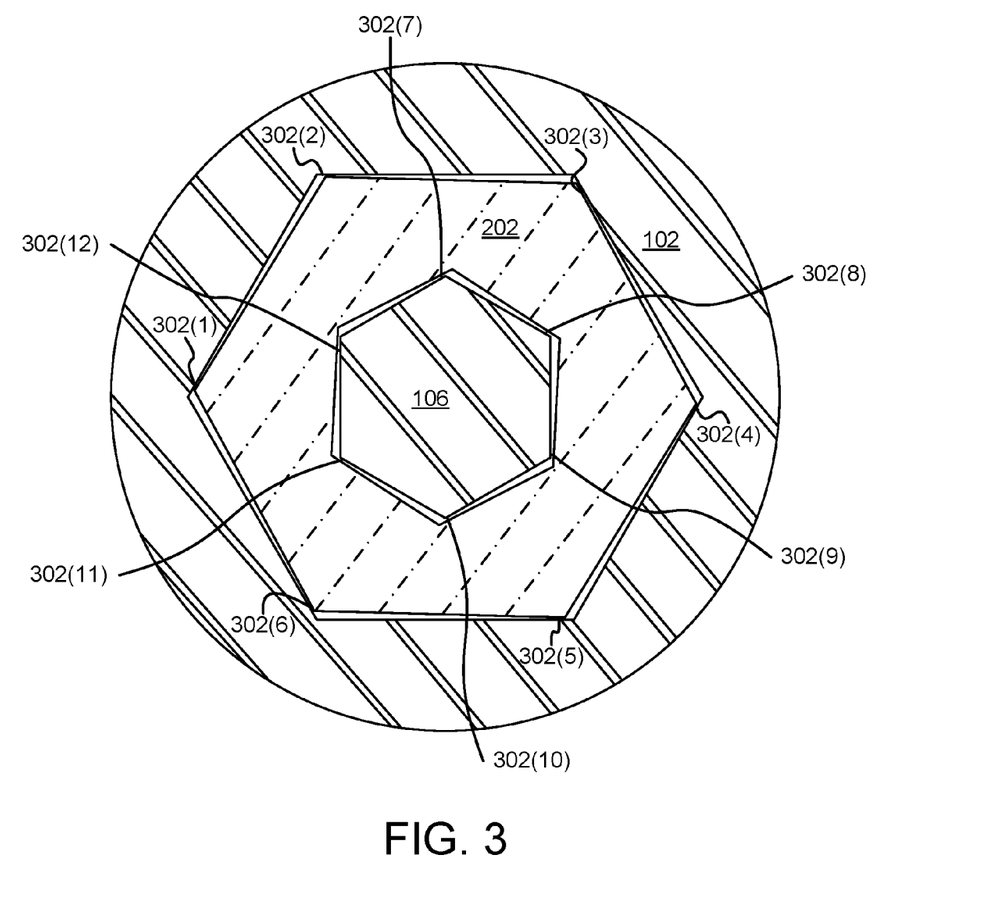
FIG. 3 is a cutaway top-down view of one embodiment of a fastener and a fastener driver for an apparatus for a fastener with an interior shaft.

FIG. 3 depicts one embodiment of a fastener 100 and a fastener driver 200 for an apparatus for a fastener with an interior shaft. In one embodiment, the fastener driver 200 inserted into the hole 104 of the fastener 100 may include one or more contact points 302 between the fastener 100 and the fastener driver 200. The one or more contact points 302 may include one or more locations where a side of the hole 104 of the head 102 of the fastener 100 engages with a side of the head 202 of the fastener driver 200. The one or more contact points 302 may include one or more locations where a side of the shaft 106 engages with a side of the hole 204 of the fastener driver 200.

For example, as depicted in FIG. 3, the head 102 of the fastener 100, the shaft 106 of the fastener 100, the head 202 of the fastener driver 200, and the hole 204 of the fastener driver 200 may each include six sides. The fastener 100 and the fastener driver 200 may include twelve contact points 302(1)-(12) between the fastener 100 and the fastener driver 200. The fastener 100 and the fastener driver 200 may include the one or more contact points 302 in response to the fastener driver 200 rotating. In one embodiment, the fastener driver 200 rotating may apply force to the fastener 100 at the one or more contact points 302. Applying force to the fastener 100 may rotate the fastener 100 and may tighten or loosen the fastener 100.

In one embodiment, the one or more contact points 302 may reduce the amount of force necessary to rotate the fastener driver 200 and tighten or loosen the fastener 100. Rotating the fastener driver 200 may apply force to the fastener 100. Increasing the number of contact points may increase the amount of force a user may exert on a fastener 100 at a given time.

In certain embodiments, the sides of the head 202 of the fastener driver 200 applying force to the sides of the hole 104 of the fastener 100 may apply torque to the fastener 100. In some embodiments, the fastener driver 200 applying force to the shaft 106 of the fastener 100 may apply torque to the center of the fastener 100. In one embodiment, the torque applied to the shaft 106 of the fastener may include a supplemental torque that is additional to the torque applied by the sides of the head 202 of the fastener driver 200 to the sides of the hole 104 of the fastener 100.

In certain embodiments, the one or more contact points 302 may allow the fastener driver 200 to apply force even if debris is lodged inside a portion of the hole 104 and blocks a contact point 302. Blocking a contact point 302 may include preventing a side of the hole 104 of the head 102 of the fastener 100 from engaging with a side of the head 202 of the fastener driver 200. Blocking a contact point 302 may include preventing a side of the shaft 106 from engaging with a side of the hole 204 of the fastener driver 200.

In one embodiment, as described above, the bottom of the hole 104 of the fastener 100, an edge of the shaft 106 of the fastener 100, an edge of a side of the head 202 of the fastener driver 200, and/or the hole 204 of the head 202 of the fastener driver 200 may include a taper. The taper may include a slight taper. In one embodiment, the slight tapering may provide a reduction or elimination of camming in response to the fastener driver 200 rotating. In one embodiment, a reduction or elimination of camming may reduce the amount of force required to rotate the fastener driver 200.

In one embodiment, as described above and depicted in FIG. 3, the hole 104 of the fastener 100, the shaft 106 of the fastener 100, the head 202 of the fastener driver 200, and the hole 204 of the fastener driver 200 may each include an equilateral hexagon. In one embodiment, the equilateral hexagon of the shaft 106 and the hole 204 of fastener driver 200 may each include an equilateral hexagon rotated 30 degrees from the respective hole 104 of the fastener 100 and the head 202 of the fastener driver 200. The 30-degree rotation may allow a user to insert the head 202 of the fastener driver 200 into the hole 104 of the fastener 100 at multiple positions. In certain embodiments, a user may insert the head 202 of the fastener driver 200 into the hole 104 of the fastener 100 at one position. In some embodiments, the number of possible positions at which a user may insert the head 202 of the fastener driver 200 into the hole 104 of the fastener 100 may depend on the shape of the hole 104 and/or the shape of the shaft 106 of the fastener 100.

As described above, one or more corners of the shaft 106 may bifurcate one or more sides of the hole 104 of the fastener 100 and one or more corners of the hole 204 of the fastener driver 200 may bifurcate one or more sides of the head 202 of the fastener driver 200. In one embodiment, in response to inserting the head 202 of the fastener driver 200 into hole 104 of the fastener 100, the bifurcations may create a locking condition. The locking condition may include the head 202 of the fastener 200 engaging the shaft 106 and engaging a side of the hole 104 of the fastener 100 in response to rotating the fastener driver 200 as depicted in FIG. 3. In one embodiment, the fastener driver 200 may not rotate without the head 202 of the fastener 200 engaging the shaft 106 and engaging a side of the hole 104 of the fastener 100.

In certain embodiments, the one or more contact points 302, absence of camming, and/or the bifurcation may allow a user to use fewer fasteners 100 to fasten to a surface or object. The user using fewer fasteners 100 may include using fewer fasteners than the use of conventional fasteners would require. In one embodiment, using fewer fasteners 100 may include using fewer fasteners 100 over time, for example, the life of the surface. In one embodiment, using fewer fasteners 100 may include using fewer fasteners 100 simultaneously to fasten to a surface. In one embodiment, a user may use fewer fasteners 100 in response to not stripping or damaging one or more portions of the fastener 100. The absence of stripping may be in response to a user applying less force to the fastener driver 200. A user applying less force may include a user applying less force than the user would apply to a conventional fastener. In response to a user applying less force to the fastener driver 200, the fastener driver 200 may apply less force to the fastener 100. Applying less force to the fastener 100 may include preventing the fastener driver 200 from stripping material from the fastener 100. As described above, in response to a user applying less force to secure a fastener to a surface or object, a user may be able to fasten more securely the fastener 100. For example, the user may be able to secure a fastener 100 more tightly to a surface or object.

Although FIG. 3 depicts a space between a side of the hole 104 of the fastener 100 and a side of the head 202 of the fastener driver 200, in some embodiments, the fastener 100 and the fastener driver 200 may not include the space. In some embodiments, the fastener 100 and the fastener driver 200 may include a larger space, and other embodiments may include a smaller space. The fastener 100 and fastener driver 200 may create the space in response to a mismatch in the size of the head 202 of the fastener driver 200 and the size of the hole 104 of the fastener 100.

Figure 4A:
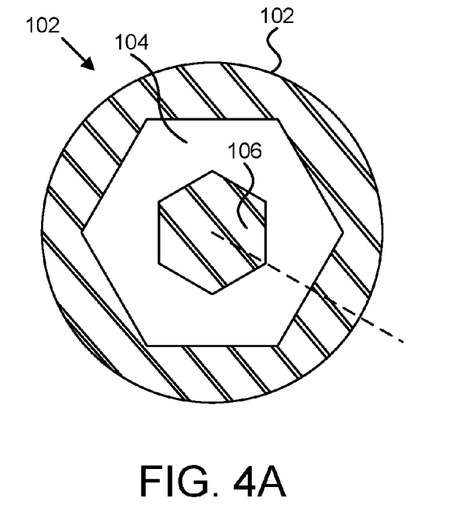
FIG. 4A is a top-down view of a further embodiment of a fastener for an apparatus for a fastener with an interior shaft.

FIG. 4A depicts one embodiment of a head 102 of a fastener 100 for an apparatus for a fastener with an interior shaft. The head 102 may include a hole 104 and a shaft 106 as described above. In one embodiment, the hole 104 and the shaft 106 may include the same shape. The size of the shaft 106 may include a size smaller than the size of the hole 104. In one embodiment, the shape of the shaft 106 may include the shape of the hole 104 rotated about the center of the head 102 of the fastener 100. In certain embodiments, the hole 104 and the shaft 106 may each include six sides, including a equilateral hexagon. In some embodiments, the shapes of the hole 104 and the shaft 106 are geometrically similar. In one embodiment, one or more corners of the shaft 106 may bifurcate one or more sides of the hole 104 of the head 102 of the fastener 100. In certain embodiments, one or more corners of the shaft may evenly bifurcate one or more sides of the hole 104 of the head 102 of the fastener 100, as shown in FIG. 4A.

Figure 4B:
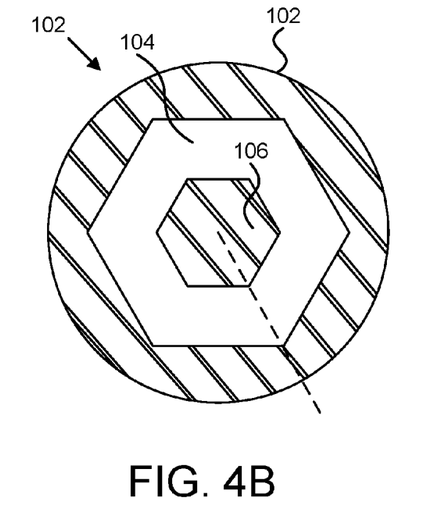
FIG. 4B is a top-down view of a further embodiment of a fastener for an apparatus for a fastener with an interior shaft.

FIG. 4B depicts a further embodiment of a head 102 of a fastener 100 for an apparatus for a fastener with an interior shaft. The head 102 includes a hole 104 and a shaft 106 as described above. In this embodiment, the hole 104 and the shaft 106 each comprise the same number of sides, and the shapes of the hole 104 and the shaft 106 are geometrically similar. The shape of the hole 104 and the shaft 106 are aligned so that each corner of the shaft 106 is located at the same angle as a corner of the hole 104. In such an embodiment, no corner of the shaft 106 bifurcates a side of the hole 104.

Figure 4C:
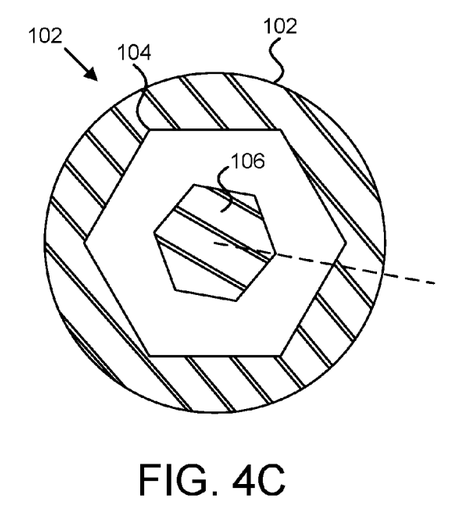
FIG. 4C is a top-down view of a further embodiment of a fastener for an apparatus for a fastener with an interior shaft.

FIG. 4C depicts a further embodiment of a head 102 of a fastener 100 for an apparatus for a fastener with an interior shaft. The head 102 includes a hole 104 and a shaft 106 as described above. In this embodiment, the hole 104 and the shaft 106 each comprise the same number of sides, and the shapes of the hole 104 and the shaft 106 are geometrically similar. In one embodiment, one or more corners of the shaft 106 may bifurcate one or more sides of the hole 104 of the head 102 of the fastener 100. In certain embodiments, one or more corners of the shaft may unevenly bifurcate one or more sides of the hole 104 of the head 102 of the fastener 100.

Figure 4D:
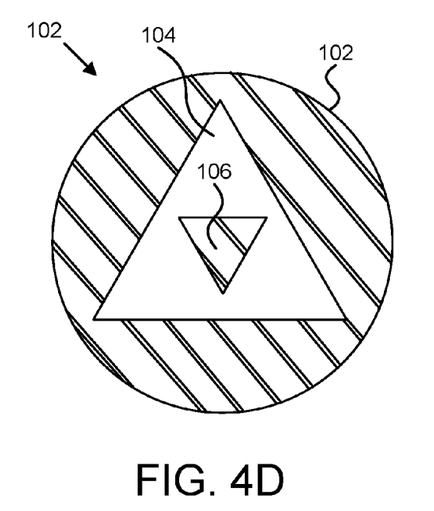
FIG. 4D is a top-down view of a further embodiment of a fastener for an apparatus for a fastener with an interior shaft.

FIG. 4D depicts a further embodiment of a head 102 of fastener 100 for an apparatus for a fastener with an interior shaft. In one embodiment, the hole 104 and the shaft 106 of the fastener 100 may each include three sides. In some embodiments, the shapes of the hole 104 and shaft 106 are geometrically similar. As described above, the corners of the shaft 106 may bifurcate the sides of the head 102 of the fastener 100. In some embodiments, the corners of the shaft 106 may evenly bifurcate the sides of the head 102 of the fastener 100, and in other embodiments, the corners of the shaft 106 may unevenly bifurcate the sides of the head 102 of the fastener 100.

Figure 4E:
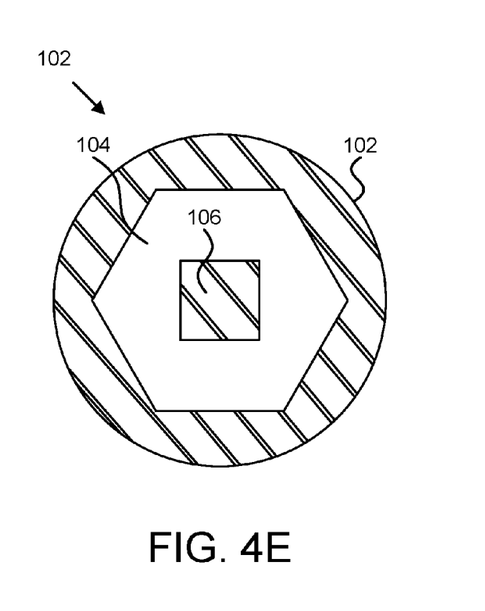
FIG. 4E is a top-down view of a further embodiment of a fastener for an apparatus for a fastener with an interior shaft.

FIG. 4E depicts a further embodiment of a head 102 of a fastener 100 for an apparatus for a fastener with an interior shaft. As described above, the head 102 may include a hole 104 and a shaft 106 as described above. In some embodiments, the shaft 106 may include a different number of sides than the hole 104. For example, as depicted in FIG. 4E, the shaft 106 may include four sides and the hole 104 may include six sides. In such cases, the shapes of the hole 104 and the shaft 106 are not geometrically similar.

Figure 4F:
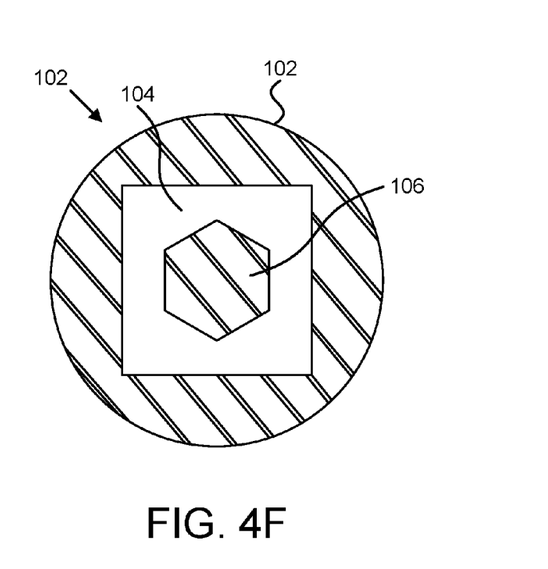
FIG. 4F is a top-down view of a further embodiment of a fastener for an apparatus for a fastener with an interior shaft.

Yet other embodiments, such as the embodiment depicted in FIG. 4F, may comprise a shaft 106 with a fewer number of sides than the hole 104. For example, as depicted in FIG. 4F, the shaft 106 may include six sides, and the hole 104 may include four sides. The embodiments are not limited to specific numbers of sides for either the shaft 106 or the hole 104.

Figure 5A:
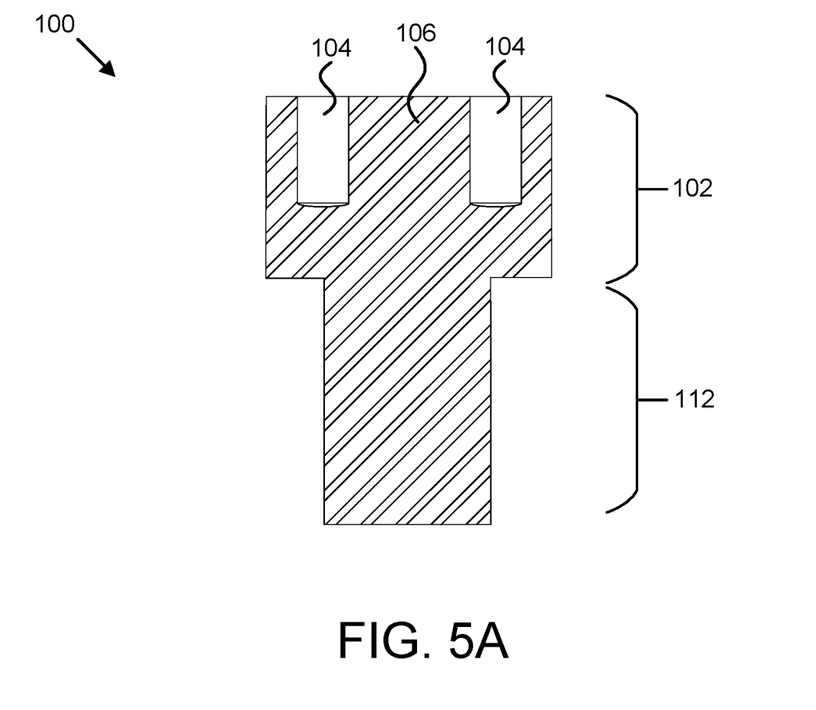
FIG. 5A is a cutaway side view of a further embodiment of a fastener for an apparatus for a fastener with an interior shaft.
Figure 5B:
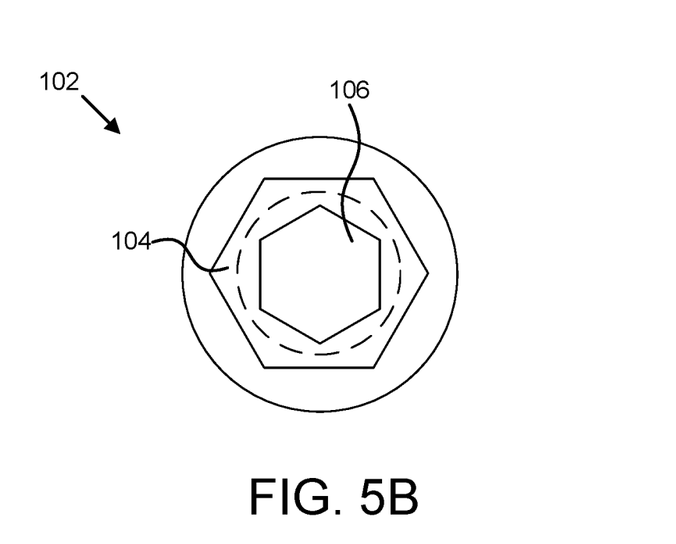
FIG. 5B is a top-down view of a further embodiment of a fastener for an apparatus for a fastener with an interior shaft.

FIGS. 5A and 5B depict one embodiment of a fastener 100 for an apparatus for a fastener with an interior shaft. The fastener 100 may include a head 102, hole 104, shaft 106, and body 112 as described above. In one embodiment, a portion of the head 102 may extend past an edge of the body 112. In one embodiment, a portion of the hole 104 may extend past an edge of the body 112. In one embodiment, the hole 104 extending past an edge of the body 112 may allow the hole 104 and/or shaft 106 to be larger. A larger hole 104 and/or shaft 106 may allow a larger head 202 of a fastener driver 200 to engage with the head 102 of the fastener 100.

Figure 6A:
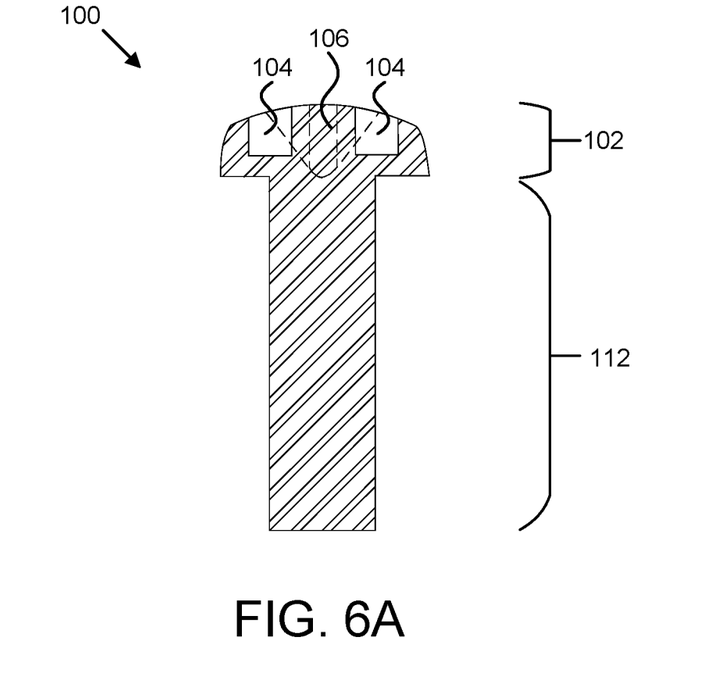
FIG. 6A is a cutaway side view of a further embodiment of a fastener for an apparatus for a fastener with an interior shaft.
Figure 6B:
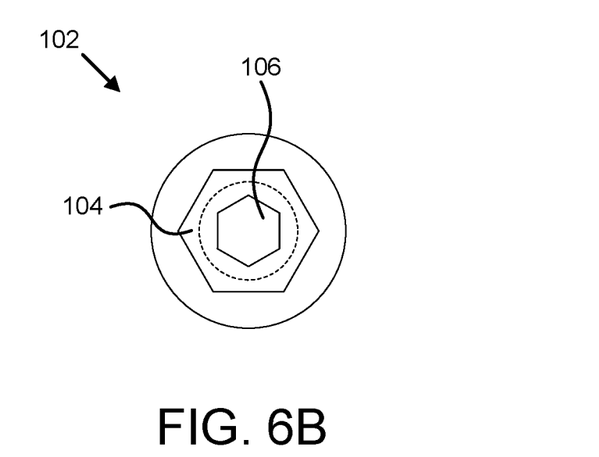
FIG. 6B is a top-down view of a further embodiment of a fastener for an apparatus for a fastener with an interior shaft.

FIGS. 6A and 6B depict one embodiment of a fastener 100 for an apparatus for a fastener with an interior shaft. The fastener 100 may include a head 102, a hole 104, a shaft 106, and a body 112 as described above. In one embodiment, the head 102 may include a curved head. The curved head may include a curved top and/or a curved edge around the head 102. The curved head may provide a smoother surface when the fastener 100 fasteners to a surface.

Figure 7A:
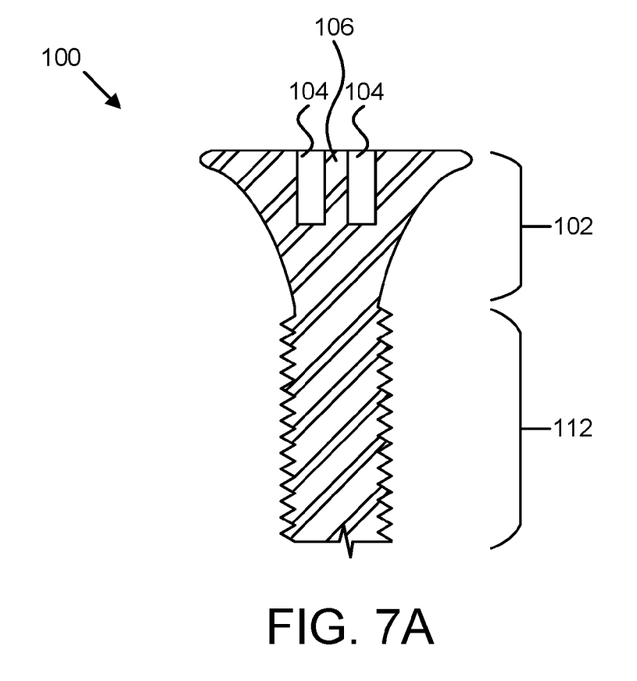
FIG. 7A is a cutaway side view of a further embodiment of a fastener for an apparatus for a fastener with an interior shaft.
Figure 7B:
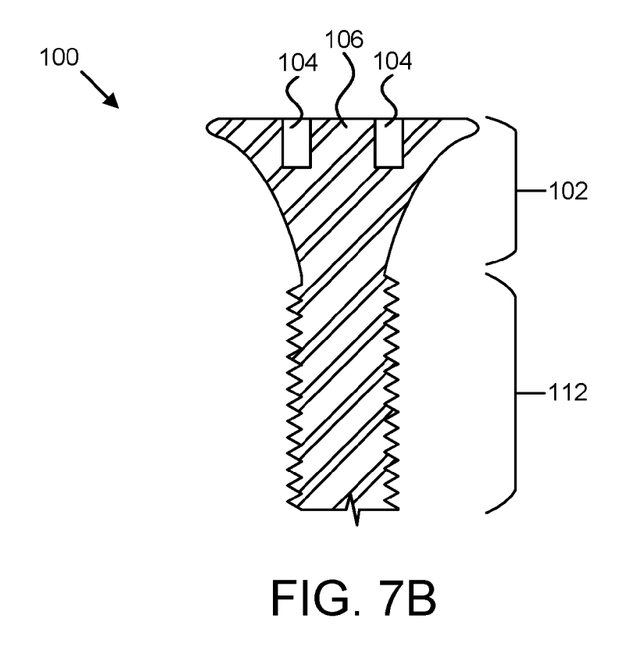
FIG. 7B is a cutaway side view of a further embodiment of a fastener for an apparatus for a fastener with an interior shaft.

FIGS. 7A and 7B depict embodiments of a fastener 100 for an apparatus for a fastener with an interior shaft. The fastener 100 may include a head 102, a hole 104, a shaft 106, and a body 112 as described above. In one embodiment, the fastener 100 may include a drywall fastener, a wood fastener, or the like (such as a GRABBER fastener). The head 102 may include a curved side that curves toward the interior of the head 102 from the top of the head 102 to the side of the body 112 as depicted in FIG. 7A. In some embodiments, the curved side may allow a portion of the head 102 to extend into a surface and may allow the top of the head 102 to be substantially smooth with the surface. In one embodiment, the hole 104 may be disposed over the body 112. In some embodiments, as depicted in FIG. 7B, a portion of the hole 104 may extend past the edge of the body 112 may allow the hole 104 and/or shaft 106 to be larger.

In some embodiments, the shaft 106 of the fastener 100 protrudes beyond the face of the fastener 100. Such an arrangement may allow easier coupling between the driver and the fastener 100 by helping to guide the driver 200 onto the fastener 100 by first coupling with the shaft 106 of the fastener, and later coupling with the hole 104 of the fastener. In other embodiments, the shaft 106 of the fastener 100 is recessed within the head 102 of the fastener 100, as opposed to being even with the head 102 of the fastener 100.

In some embodiments, the shaft 106 may be engineered to shear and break away from the fastener 100 once a specified level of torque is applied to the shaft 106. Other embodiments provide for deformation of the shaft 106 once a specified level of torque is applied to the shaft 106. Certain applications require that fasteners not be tightened beyond a certain amount of torque, and by shearing off the shaft 106 of the fastener 100, over-torquing of the fastener 100. Other embodiments may provide for the walls of the fastener head 102 formed by the hole 104 of the fastener to shear away or deform to prevent over-torquing of the fastener 100.

In one embodiment, a method of forming a fastener may include cold forming. In one embodiment, the method includes providing a piece of material. The material may include a metal. For example, the material may include iron, steel, aluminum, titanium, or another metal. In one embodiment, the material may include a rod. The rod may include a width, diameter, or the like that matches a diameter of a body of a fastener. In one embodiment, the width, diameter, or the like of the rod may include a width, diameter, or the like smaller or larger than a body of a fastener.

In some embodiments, the method includes forming a head of the fastener. In one embodiment, forming the head may include applying a force to an end of the material. In response to applying a force to an end of the material, a portion of the end of the material may move away from the center of the material. For example, the material may move to a side of the material. The material may move past the edge of the material and form a head wider than the width, diameter, or the like of the material. The displaced material may form the head of the fastener.

In one embodiment, the method includes forming a hole of the fastener. In certain embodiments, forming the hole may include forming the hole in the head of the fastener. In one embodiment, forming the hole includes applying a force to the head of the fastener. In one embodiment, applying the force to the head may include applying the force to the center of the head. Applying the force may include moving a portion of material of the head to one or more sides of the head to form a cavity in the head. In some embodiments, applying the force may include moving a portion of the material of the head away from the top of the head an into another portion of the material. In one embodiment, applying the force may include not applying a force to a portion of the head to create the shaft of the head.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a head comprising
      a hole comprising at least three sides, and
      a shaft comprising at least three sides disposed inside the hole; and
   a body coupled to the side of the head opposite of the hole,
   wherein an edge of the shaft of the apparatus is tapered.

2. The apparatus of claim 1, wherein
   the hole and the shaft each comprise the same number of sides.

3. The apparatus of claim 2, wherein
   the shape of the hole and the shape of the shaft are substantially geometrically similar.

4. The apparatus of claim 3, wherein
   the hole comprises six sides; and
   the shaft comprises six sides.

5. The apparatus of claim 4, wherein
   each corner of the shaft evenly bifurcates a side of the hole.

6. The apparatus of claim 3 wherein
   each corner of the shaft evenly bifurcates a side of the hole.

7. The apparatus of claim 3, wherein
   each corner of the shaft is aligned with a center point of the shaft and a corner of the hole.

8. The apparatus of claim 1, wherein
   at least one corner of the shaft evenly bifurcates a side of the hole.

9. The apparatus of claim 1, further comprising
   a threading coupled to the body.

10. The apparatus of claim 1, further comprising
    a flange coupled to the head.

11. A system, comprising
    a fastener apparatus, comprising:
       a head comprising a hole comprising at least three sides and a shaft comprising at least three sides disposed inside the hole, and
       a body coupled to the side of the head opposite of the hole,
       wherein at least one corner of the shaft unevenly bifurcates a side of the hole; and
    a fastener driver apparatus, comprising:
       a driver head comprising at least three sides; and
       a driver hole disposed within the head, the hole comprising at least three sides.

12. The system of claim 11, wherein
    the driver head and the driver hole each comprise the same number of sides.

13. The system of claim 12, wherein
    the shape of the driver head and the shape of the driver hole are substantially geometrically similar.

14. The system of claim 12, wherein
    the driver head comprises six sides; and
    the driver hole comprises six sides.

15. A method, comprising
    providing a fastener apparatus that comprises:
       a head of a fastener apparatus that comprises a hole comprising at least three sides, and a shaft comprising at least three sides disposed inside the hole, wherein a recessed face of the hole of the fastener apparatus is tapered, and
       a body of a fastener apparatus that is coupled to a side of the head opposite the hole; and
    driving the fastener apparatus into a hole.

16. The method of claim 15, further comprising:
    providing a fastener driver apparatus that comprises:
       a head comprising at least three sides, and
       a hole disposed within the head, the hole comprising at least three sides; and
    wherein driving the fastener apparatus comprises using the fastener driver apparatus to drive the fastener apparatus into the hole.

* * * * *